United States Patent
Matsuwaki et al.

(10) Patent No.: US 8,646,212 B2
(45) Date of Patent: Feb. 11, 2014

(54) SEAL STRUCTURE FOR VEHICLE

(75) Inventors: Kanji Matsuwaki, Hiroshima (JP); Kousuke Terada, Machida (JP); Shinya Murakami, Machida (JP)

(73) Assignee: Nishikawa Rubber Co., Ltd., Hiroshima-shi, Hiroshima-ken (JP)

( * ) Notice: Subject to any disclaimer, the term of this patent is extended or adjusted under 35 U.S.C. 154(b) by 0 days.

(21) Appl. No.: 13/324,096

(22) Filed: Dec. 13, 2011

(65) Prior Publication Data

US 2012/0159860 A1    Jun. 28, 2012

(30) Foreign Application Priority Data

Dec. 22, 2010  (JP) ................ 2010-285824

(51) Int. Cl.
   *E05D 15/16* (2006.01)
(52) U.S. Cl.
   USPC .......... 49/441; 49/484.1; 49/489.1; 49/492.1; 49/495.1; 49/475.1
(58) Field of Classification Search
   USPC ............ 49/475.1, 484.1, 489.1, 490.1, 492.1, 49/440, 441, 495.1
   See application file for complete search history.

(56) References Cited

U.S. PATENT DOCUMENTS

| | | | | |
|---|---|---|---|---|
| 5,356,194 A | * | 10/1994 | Takeuchi | 296/146.9 |
| 5,806,914 A | * | 9/1998 | Okada | 296/146.9 |
| 6,213,536 B1 | * | 4/2001 | Raisch et al. | 296/146.9 |
| 6,679,003 B2 | * | 1/2004 | Nozaki et al. | 49/441 |
| 2005/0279027 A1 | * | 12/2005 | Tsuchida et al. | 49/495.1 |
| 2007/0180775 A1 | * | 8/2007 | Anders | 49/495.1 |

FOREIGN PATENT DOCUMENTS

JP  08-058389    3/1996

* cited by examiner

*Primary Examiner* — Katherine Mitchell
*Assistant Examiner* — Catherine A Kelly
(74) *Attorney, Agent, or Firm* — Robert P. Michal; Lucas & Mercanti, LLP (57) ABSTRACT

There is provided a seal structure for vehicle that includes a weather strip member 8 installed to a retainer member 9 provided to a circumference edge of a body aperture 7 and having a substantially "U" shape in section. The weather strip member 8 includes a primary seal lip 10 installed to an outer-cabin side surface part 9a of the retainer member 9 and makes a contact with an outer-cabin side surface 6b of a glass panel member 6, and a secondary seal lip 11 installed to an inner-cabin side surface part 9b and makes a contact with an inner-cabin side surface 6c of the glass panel member 6. The weather strip member 8 further includes a hollow seal part 12 installed near a bottom surface part 9c of the retainer member 9 and makes an elastic contact with a periphery end 6a of the glass panel member 6.

11 Claims, 9 Drawing Sheets

SEAL STRUCTURE FOR VEHICLE

This application claims the benefit under 35 USC 119 of JP Patent Application JP 2010-285824 filed Dec. 22, 2010, the entire disclosure of which is incorporated herein by reference.

BACKGROUND OF THE INVENTION

The present invention relates to a seal structure for vehicle, which is installed to a body aperture of a vehicle and watertightly seals between a periphery edge of the body aperture and a glass panel member that is installed to move upward and downward.

Japanese Unpublished Patent Publication No. Hei 8-58389 discloses a seal structure for vehicle, which is installed to a body aperture of the vehicle. The seal structure includes a weather strip member that is installed to a periphery edge of the body aperture. The weather strip member is adapted to make a contact with a periphery edge of a glass panel member, which is configured to move upward and downward, to provide a watertight condition.

In the above-mentioned conventional seal structure for vehicle, the weather strip member is made of rubber and is provided inside an external molding member.

The weather strip member includes a primary seal lip, a secondary seal lip and a hollow seal part, which are integrally molded. The primary seal lip makes a contact with an outer side surface of a periphery edge of the glass panel member, while the secondary seal lip makes a contact with an inner side surface thereof. The hollow seal part is placed at a bottom surface part of a concave part formed along the periphery edge of the body aperture to which the weather sarin member is tightly fitted.

In the conventional seal structure for vehicle the periphery edge of the body aperture, to which the weather strip member is installed, includes a curved corner part between a relatively horizontal part formed near a roof panel member of the vehicle and a downwardly extending part formed along a pillar part thereof.

Accordingly, the cross-sectional shape of the weather strip member is gradually changed to correspond to a shape of the corner part. However, a joint line is formed at a section where the cross-sectional shape changes drastically.

That is, the joint line is formed when two or more constituting parts of the weather strip member, which extend in their respective longitudinal directions, are continuously joined with their end surfaces being faced with each other.

Further, in the conventional seal structure for vehicle, a depth dimension of a part of the weather strip member near the pillar part is arranged relatively larger than a part of the weather strip near the roof panel member to properly seal near the pillar part. Therefore, it is difficult to integrally mold the primary seal lip, the secondary seal lip and the hollow seal part, and requires a precise installation of the weather strip member. Further, it would deteriorate a sealing property of the weather strip member after the installation.

It is therefore an object of the invention to provide a seal structure for vehicle that is able to provide a good sealing property regardless of an installed position of a weather member and variation of a construction.

SUMMARY OF THE INVENTION

A seal structure for vehicle is provided to a body aperture of a vehicle. The seal structure includes a weather strip member installed to a circumference edge of the body aperture, and is adapted to make a contact with a circumference edge of a glass panel member that is designed to move in an up-and-down direction in the body aperture for sealing in a watertight condition. The weather strip member is adapted to be installed to a retainer member. The retainer member has substantially a "U" shape in cross section and is provided to the circumference edge of the body aperture. The retainer member includes an outer-cabin side surface part, an inner-cabin side surface part and a bottom surface part that connects between the outer-cabin side surface part and the inner-cabin side surface part.

The weather strip member comprises a primary seal lip that is installed to the outer-cabin side surface part of the retainer member and is adapted to make an elastic contact with an outer-cabin side surface of the glass panel member. The weather strip member further comprises a secondary seal lip that is installed to the inner-cabin side surface part of the retainer member and is adapted to make an elastic contact with an inner-cabin side surface of the glass panel member.

The weather strip member further comprises a hollow seal part that is installed at the bottom surface part of the retainer member. The hollow seal part includes a contact surface that is adapted to make an elastic contact with the end edge part of the glass panel member. The hollow seal part further includes a hollow part inside the contact surface thereof.

The primary seal lip and the secondary seal lip are either independently formed or separably formed at least partially in a longitudinal direction thereof.

According to the seal structure for vehicle of the present invention, the primary seal lip of the weather strip member, which is installed to the retainer member provided along the circumference edge of the body aperture, is adapted to make an elastic contact with the outer side surface of the glass panel member, thereby providing a properly sealed condition and an improved noise insulation property.

Moreover, when the primary seal lip and the secondary lip part are independently formed, the secondary seal lip is able to make an elastic contact with the inner side surface of the glass panel member despite a shape of the circumference edge of the body aperture. Further, when the primary lip part and the secondary seal lip are separably formed at least partially in the longitudinal direction, the secondary seal lip can be installed separately from the primary seal lip, so that it is also able to make an elastic contact with the inner side surface of the glass panel member despite a shape of the circumference edge of the body aperture. Accordingly, even if a waterdrop intrudes through the primary seal lip, it is drained outside through the secondary seal lip and is prevented from intruding inside an inner-cabin side of the vehicle, whereby the weather strip member is able to provide an improved sealing property.

Further, the hollow seal part disposed at the bottom surface part of the retainer member is raised by the hollow part, so that a dimension in a direction along which the hollow seal part elastically deforms is increased when the end edge part of the glass panel member makes an elastic contact with the hollow seal part.

The hollow seal part installed at the bottom surface part of the retainer member can be excluded at a section below a point where the secondary seal lip is initially separated from the primary seal lip.

With such a configuration, it is possible to provide a wider sealing margin and an improved sealing property despite of a position the weather strip member is to be installed and variation of a construction.

PREFERRED EMBODIMENT OF THE INVENTION

A seal structure for vehicle according to an embodiment of the present invention will be described referring to the drawings.

Figure 1:
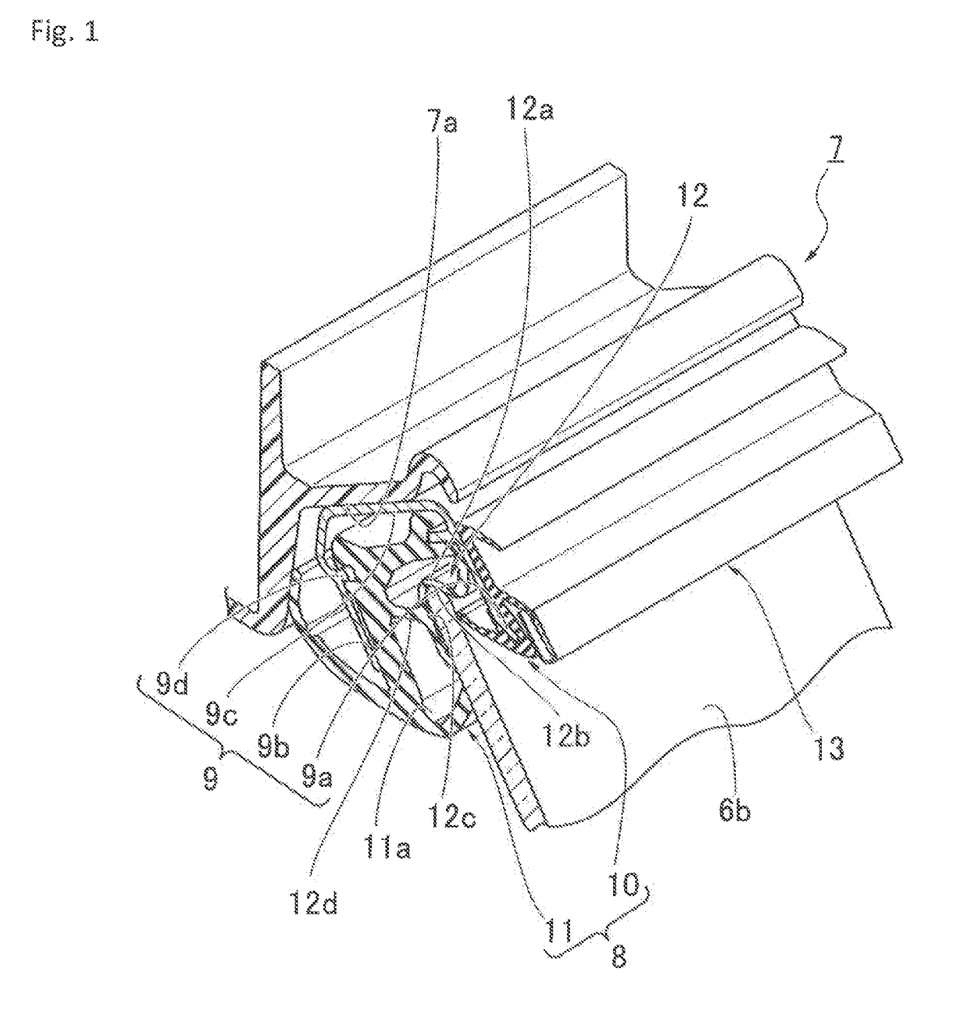
FIG. 1 is a partially cross sectional perspective view showing a primary construction of a seal structure for vehicle according an embodiment of the present invention in which a weather strip member is installed to a body aperture.
Figure 2:
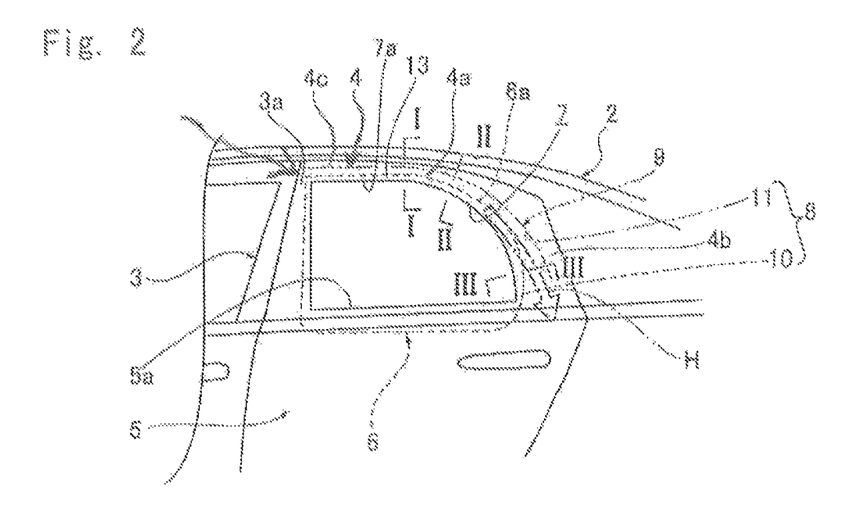
FIG. 2 is a schematic side elevation view showing a rear part of a vehicle to which the seal structure for vehicle according to the embodiment is installed.

First, an overall structure of the seal structure for vehicle will be described with reference to FIGS. 1 to 6. As illustrated in FIG. 2, the seal structure includes a roof member 4 that is provided at a side in a body rear part 2 of a vehicle 1. The roof member 4 extends rearward from an upper end 3a of a center pillar member 3 formed in a standing posture.

The roof member 4 includes a ceiling part 4c that is substantially flat and a curved part 4a that is curvedly formed from a rear end of the ceiling part 4c and is bent downwardly. The roof member 4 includes a rear pillar part 4b so as to form a continuous flat surface.

A rear waist part 5 is provided to the body rear part 2, and a glass panel member 6, which is configured to move upward and downward, is provided to the rear waist part 5.

The glass panel member 6 is adapted to move upward and downward to open and close a body aperture 7 that is surrounded by the center pillar member 3, the ceiling part 4c, the curved part 4a and the rear pillar part 4b of the roof member 4, and a waist car line 5a of the waist part 5.

A weather strip member 8 is installed to the ceiling part 4c, the curved part 4a and a lower end of the rear pillar part 4b of the roof member 4 in a circumference edge 7a of the body aperture 7.

The weather strip member 8 is installed to a metal made retainer member 9 that is formed in a substantially "U" shape in section and is provided along the circumference edge 7a of the body aperture 7.

The retainer member 9 includes an outer-cabin side surface part 9a, an inner-cabin side surface part 9b, a bottom surface part 9c connecting between the outer-cabin side surface part 9a and the inner-cabin side surface part 9b, and a pair of engagement claw parts 9d, 9d. The pair of engagement claw parts 9d, 9d extend inwardly from the outer-cabin side surface part 9a and the inner-cabin side surface part 9b, respectively, near the bottom surface part 9c, and hold the weather strip member 8 from both sides.

A periphery end 6a forming a circumference end of the glass panel member 6 and its neighboring part, which moves upward and downward in the body aperture 7, make a contact with the weather strip member 8 to provide a watertight sealing condition.

The weather strip member 8 includes a primary seal lip 10 and a secondary seal lip 11. The primary seal lip 10 is installed to the outer-cabin side surface part 9a of the retainer member 9 and includes a lip body 10a that is elastically deformable. The lip body 10a is held at its one side and makes an elastic contact with an outer-cabin side surface 6b of the glass panel member 6. The secondary seal lip 11 is installed to the inner-cabin side surface part 9b of the retainer member 9 and includes a lip body 11b that extends and is elastically deformable. The lip body 11b makes an elastic contact with an inner-cabin side surface 6c of the glass panel member 6.

The primary seal lip 10 and the secondary seal lip 11 are formed separately at least at one section. In this embodiment, the primary seal lip 10 and the secondary lip part 11 are separately formed from the curved part 4a to the lower end of the rear pillar part 4b as illustrated in FIG. 2.

The weather strip member 8 further includes a hollow seal part 12 that is formed integrally with the secondary seal lip 11, opposing the bottom surface part 9c of the retainer member 9. The hollow seal part 12 includes a shared division wall 12d at a side of the secondary seal lip 11 as a part of the hollow seal part 12.

The hollow seal part 12 has its inside a hollow part 12a. The hollow seal part 12 also has a contact surface 12b that extends in the direction toward a body aperture 7 to form a mounting shape in cross section with an edge line 12c whereby the hollow seal part 12 makes an elastic contact with the periphery end 6a of the glass panel member 6 to provide an improved sealing property.

Moreover, the weather strip member 8 in the seal structure according to this embodiment includes a secondary seal side hollow part 11a that is formed at a root part of the secondary seal lip 11 and supports the secondary seal lip 11. The shared division wall 12d is formed between the secondary seal side hollow part 11a and the hollow part 12a. A thickness of the shared division wall 12d is larger than a circumference wall forming the hollow part 12a and is substantially the same as a circumference wall forming the secondary seal side hollow part 11a. The shared division wall 12d is integrally formed in an extending longitudinal direction.

Figure 4:
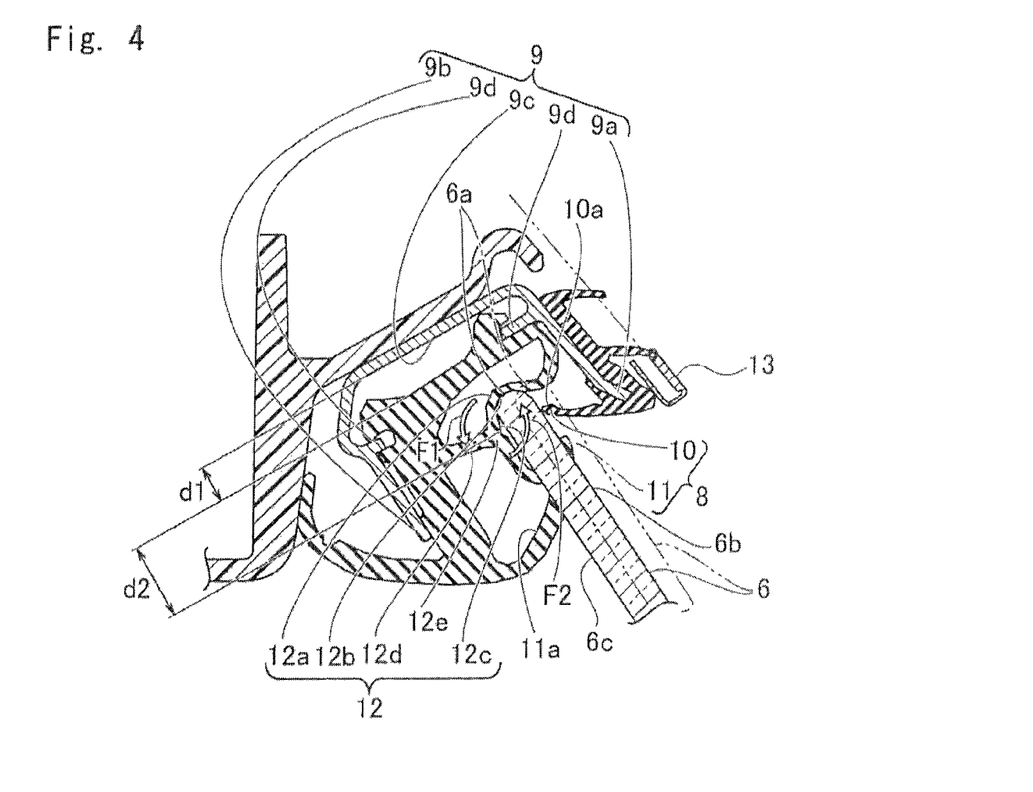
FIG. 4 is an enlarged cross section view showing the seal structure for vehicle according to the embodiment corresponding to FIG. 1 in which a glass panel member illustrated by the solid line is moved to an outer-cabin side whereby an end edge part of the glass panel member is elastically contacted to a hollow seal part of the weather strip member as illustrated by the two-dotted line.
Figure 5:
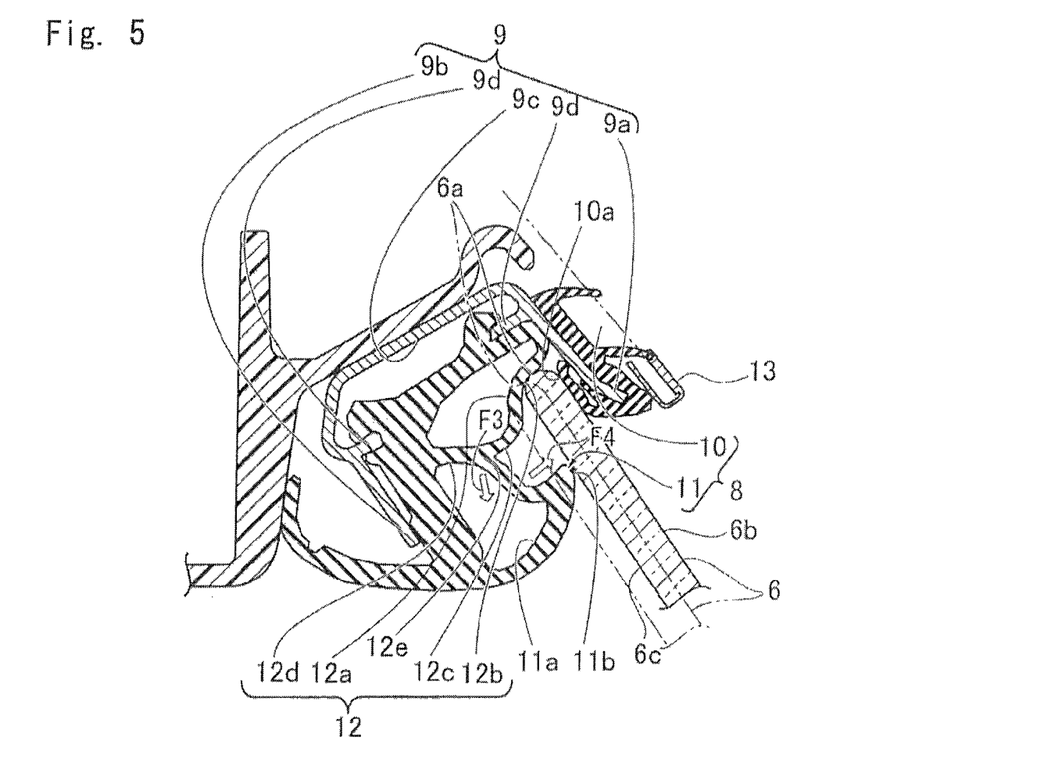
FIG. 5 is an enlarged cross section view showing the seal structure for vehicle according to the embodiment corresponding to FIG. 1 in which a glass panel member illustrated by the solid line is moved to an inner-cabin side whereby an end edge part of the glass panel member is elastically contacted to a hollow seal part of the weather strip member as illustrated by the two-dotted line.

As illustrated in FIGS. 4 and 5, a base end 12e of a circumference wall of the hollow part 12a is connected, in a substantially crossing direction, to the shared division wall 12d at a position closer to a tip end of the shared division wall 12*d* (at a side of the bottom surface part 9*c*) than a midpoint part of the shared division wall 12*d*.

Accordingly, in case the periphery end 6*a* of the glass panel member 6 makes a contact with the hollow seal part 12 at a point deviating toward the inner-cabin side of the vehicle from the edge line 12*c* of the contact surface 12*b* of the hollow part 12*a* as illustrated by a two-dotted line in FIG. 4, the lip body 10*a* of the primary seal lip 10 follows the glass panel member 6 toward the inner-cabin side and continues to make an elastic contact with the glass panel member 6. A tip end of the lip body 11*b* of the secondary seal lip 11 is arranged to push the inner-cabin side surface 6*c* of the glass panel member 6 in the direction F2 by the push-press force F1 applied in a counterclockwise direction about the base end 12*e* as illustrated in FIG. 4.

Moreover, in case the periphery end 6*a* of the glass panel member 6 makes a contact with the hollow seal part 12 at a point deviating toward the outer-cabin side of the vehicle from the edge line 12*c* of the contact surface 12*b* of the hollow part 12*a* as illustrated by the two-dotted line in FIG. 5, the shared division wall 12*d* is pushed toward the lower declined direction F3 by the base end 12*e* of the circumference wall of the hollow part 12*a*, and the tip end of the lip body 11*b* of the secondary seal lip 11 is pushed out toward the outer-cabin direction F4.

Figure 3A:
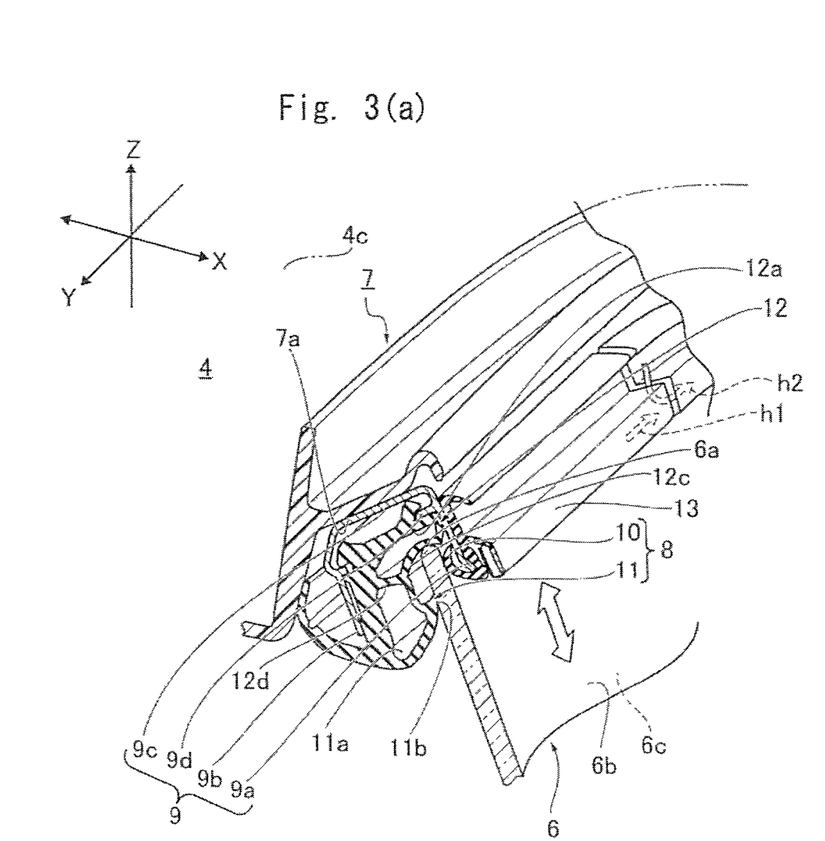
FIG. 3(a) is a cross section view along the line I-I in FIG. 2 showing with the solid line the seal structure for vehicle according to the embodiment in which components of the seal structure are illustrated.
Figure 3B:
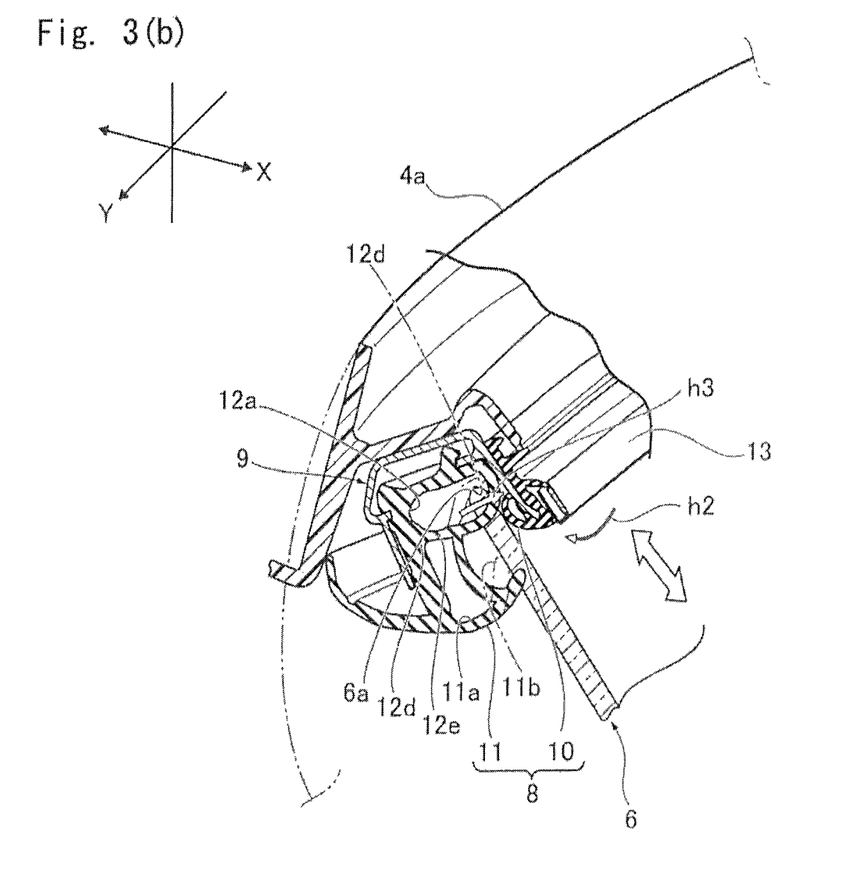
FIG. 3(b) is a cross section view along the line II-II in FIG. 2 showing with the solid line the seal structure for vehicle according to the embodiment in which components of the seal structure are illustrated.
Figure 3C:
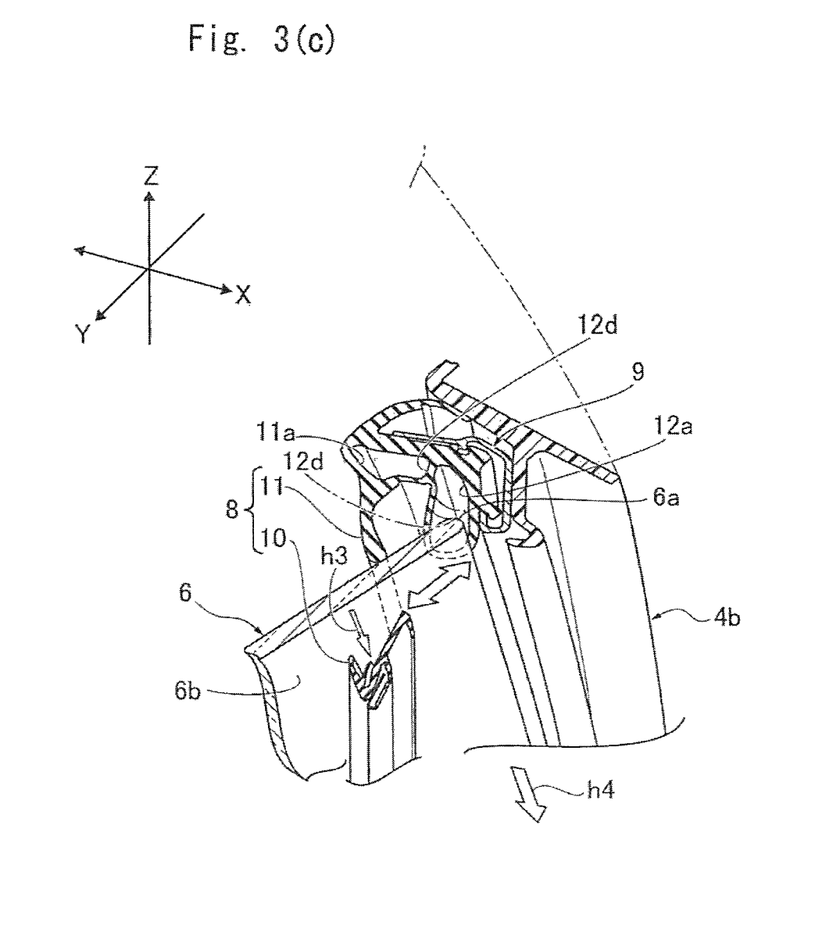
FIG. 3(c) is a cross section view along the line III-III in FIG. 2 showing with the solid line the seal structure for vehicle according to the embodiment in which components of the seal structure are illustrated.

Further, as illustrated in FIGS. 3A, 3B and 3C, the weather strip member 8 extending in the longitudinal direction has different cross-sectional shapes in accordance with the shape of the circumference edge 7*a* of the body aperture 7.

The primary seal lip 10, the secondary seal lip 11 and the hollow seal part 12 change their cross-sectional shapes at different positions in the extending longitudinal direction of the weather strip member 8.

Effects of the seal structure for vehicle according to the embodiment will be described below.

As illustrated in FIG. 2, the weather strip member 8 is installed to the retainer member 9 extending along the circumference edge 7*a* of the body aperture 7 such that the primary seal lip 10 is attached to an inner-cabin side of an edge part of a molding member 13 provided for decoration (along, the circumference edge 7*a* of the body aperture 7). The molding member 13 covers the primary seal lip 10. As illustrated in FIGS. 3(*a*), 3(*b*) and 3(*c*), the primary seal lip 10 is separated from the secondary seal lip 11 and the hollow seal part 12, which extend in the longitudinal direction, at a lower part of the rear pillar part 4*b*.

The lip body 10*a* of the primary seal lip 10 makes an elastic contact with an outer side surface 6*b* of the glass panel member 6 to provide a watertight condition and an improved noise insulation property.

The secondary seal lip 11 is installed to the inner-cabin side surface part 9*b* of the retainer member 9 and makes an elastic contact with an inner-cabin side surface 6*c* of the glass panel member 6. A tip end of the lip body 11*b* of the secondary seal lip 11 is spaced apart from the primary seal lip 10 at least at a part in a descending area between the curved part 4*a* and the rear pillar part 4*b*.

Accordingly, the tip end of the lip body 11*b* is able to make an elastic contact with the inner-cabin side surface 6*c* of the glass panel member 6 regardless of the curved shape and design of the circumference edge 7*a* of the body aperture 7. Therefore, as illustrated in FIGS. 3(*a*), 3(*b*) and 3(*c*), even when water h1, h2 intrudes between the primary seal lip 10 and the outer-cabin side surface 6*b* of the glass panel member 6, the water h1, h2 is prevented from intruding into the inner-cabin side of the vehicle. The water H (that is, h3, h4) then flows down along the secondary seal lip 11 and is drained from a body rear part 2 as illustrated in FIG. 2. Thus, the weather strip member 8 is able to provide an improved watertight property.

Moreover, as shown in FIGS. 4 and 5, the hollow seal part 12 is placed opposing to the bottom surface part 9*c* of the retainer member 9 having a groove shape. The hollow seal part 12 is spaced apart from the bottom surface part 9*c* for a predetermined distance d1 by a pair of engagement claw parts 9*d*, 9*d*.

The predetermined distance d1 in addition to a height-direction dimension d2 up to the edge line 12*c* of the head top part of the hollow seal part 12 can raise a stroke dimension of the periphery end 6*a* of the glass panel member 6, by which the periphery end 6*a* is able to move elastically maintaining an elastic contact and a good sealing property with respect to the contact surface 12*b*.

Therefore, it is possible to provide an enough margin space for sealing and an improved sealing property regardless of a variation in installation and construction to the circumference edge 7*a* of the body aperture 7.

Further, as illustrated in FIGS. 3A, 3B and 3C, the weather strip member 8 extending in a longitudinal direction has various cross-sectional shapes in accordance with the shape of the circumference edge 7*a* of the body aperture 7.

The cross-sectional shapes of the primary seal lip 10, the secondary seal lip 11 and the hollow seal part 12 are varied at different positions in the extending longitudinal direction of the weather strip member 8.

The primary seal lip 10, the secondary seal lip 11 and the hollow seal part 12 of the weather strip member 8 are not integrally formed respectively in the longitudinal direction, and each of them is made of three different parts having considerably different cross-sectional shapes as illustrated in FIG. 3(*a*), FIG. 3(*b*) and FIG. 3(*c*). Those parts are abutted with one another at their end surfaces, thereby forming a continuous sealing structure.

Figure 6:
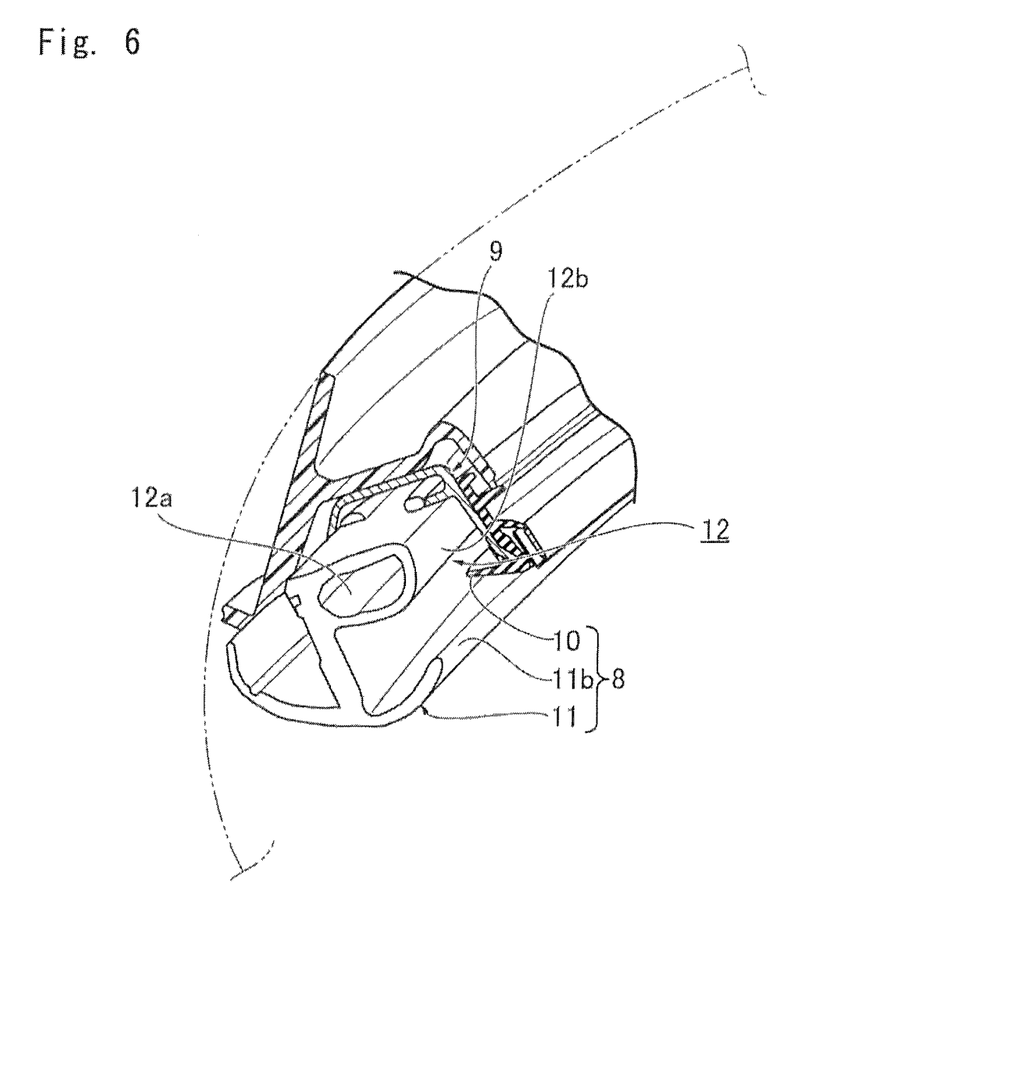
FIG. 6 is a partially cross sectional perspective view showing the seal structure for vehicle in which an end of the weather strip member illustrated in FIG. 3(b) is facing to a member illustrated in FIG. 3(a).

The abutted parts of the weather strip member 8 generate joint lines that form passages for water from outside. However, the end of the primary seal lip 10 and the ends of the secondary seal lip 11 and the hollow seal part 12 are placed at different positions in the extending longitudinal direction as shown in FIG. 6, which shows the end of the member illustrated in FIG. 3(*b*) directed to the member illustrated in FIG. 3(*a*). Similarly, ends corresponding to those ends are placed at different points in the extending longitudinal direction, so that even when the joint lines between the primary seal lip 10 and the secondary seal lip 11 or the primary seal lip 10 and the hollow seal part 12 generate a concavo-convex (step) form, water is prevented from intruding into the inner-cabin side of the vehicle, whereby the weather strip member 8 provides a good sealing property.

Accordingly, even the ends each having considerably different cross-sectional shapes are connected with one another forming the step form between them, the weather strip member 8 is able to provided a good sealing property.

Moreover, although in this embodiment the primary seal lip 10 is divided at a point in the longitudinal direction of the weather strip member 8 where the secondary seal lip 11 and the hollow seal part 12 are not divided, other arrangements can be applied. That is, the ends of the primary seal lip 10 and the hollow seal part 12 can be positioned at different points in the longitudinal direction of the weather strip member 8, while the ends of the secondary seal lip 11 and the hollow seal part 12 can be positioned at different points in the longitudinal direction thereof. The weather strip member 8 with such a construction is able to further prevent an intrusion of water.

The weather strip member 8 with the above construction allows at least either the primary seal lip 10, the secondary seal lip 11 or the hollow seal part 12 to be positioned in the longitudinal direction of the weather strip member 8. Therefore, the weather strip member 8 can be disposed all through an entire length between the circumference edge 7a of the body aperture 7 and the periphery end 6a of the glass panel member 6, where a proper sealing is required. Accordingly, the weather strip member 8 is able to provide a good sealing property everywhere the weather strip member 8 takes place.

The hollow seal part 12 of the weather strip member 8 has the hollow part 12a inside thereof, so that it can elastically deform easily.

The weather strip member 8 is installed as it is held in an engagement manner from both sides by the pair of engagement claw parts 9d, 9d extending inwardly in a space from inner side surfaces of the retainer member 9 near the bottom surface part 9c having a substantially "U" shape in cross section. The space near the bottom surface part 9c was originally a dead space.

Accordingly, it is possible to easily install the weather strip member 8 to the circumference edge 7a of the body aperture 7 by utilizing the space, and by allowing the weather strip member 8 to simply follow, for example, a corner curve shape of the circumference edge 7a.

As illustrated in FIG. 4, the hollow seal part 12 of the weather strip member 8 is spaced apart and raised from the bottom surface part 9c for a predetermined distance d1.

Therefore, it is possible to maintain a sealed condition until the periphery end 6a of the glass panel member 6 contacts substantially the bottom surface part 9c through the distance d1 in addition to the dimension d2 (d1 plus d2). The dimension d2 is a distance in a height direction up to the edge line 12c of the head top part of the contact surface 12b raised by the hollow part 12a formed inside the hollow seal part 12.

While the sealed condition is maintained, the periphery end 6a of the glass panel member 6 makes an elastic contact with the contact surface 12b of the hollow seal part 12. This improves a degree of freedom in design and shape of the body rear part 2 as well as a degree of freedom in an up-and-down movement of the glass panel member 6.

Moreover, in this embodiment the hollow seal part 12 is configured to raise its height toward the inner-cabin side of the vehicle by the edge line 12c at the head top part of the contact surface 12b. Therefore, as illustrated by a solid line in FIG. 4, even when the periphery end 6a of the glass panel member 6 moves toward the inner-cabin side of the vehicle, the periphery end 6a overlaps with the hollow seal part 12 with an increased degree.

Accordingly, the hollow seal part 12 is able to provide an improved sealing property before the primary seal lip 10 is deteriorated in its sealing property caused by the movement of the periphery end 6a of the glass panel member 6 toward the inner-cabin side of the vehicle.

Moreover, since the inner side surface 6c of the glass panel member 6 makes an elastic contact with the secondary seal lip 11, pushing the glass panel member 6 to the outer-cabin side of the vehicle, the weather strip member 8 further prevents a possible deterioration in sealing property.

This can provide an improved construction allowance of the glass panel member 6 including an elevating system, and an improved dimensional allowance of a roof member 4.

Further, in this embodiment the hollow seal part 12, which is integrally formed with the secondary seal lip 11 and disposed opposing the bottom surface part 9c of the retainer member 9, is configured to include, as a part at one side thereof, the shared division wall 12d formed at a side of the secondary seal lip 11.

Therefore, the hollow seal part 12 hardly interferes with the secondary seal lip 11 in an elastic deformation movement, and the secondary seal lip 11 and the hollow seal part 12 are able to provide an improved sealing property without increasing their cross-sectional shapes in a vertical direction of the vehicle (Z direction).

Moreover, the shared division wall 12d forming a part of the hollow seal part 11a of the secondary seal lip 11 is used as a shared wall to form a part of the hollow part 12a of the hollow seal part 12 near the bottom surface part 9c of the retainer member 9.

As illustrated in FIGS. 4 and 5, the base end 12e of the hollow part 12a is connected, in a substantially vertical direction, to the shared division wall 12d (at a side of the bottom surface part 9c) at a position closer to a tip end from a mid point thereof.

Therefore, even when the periphery end 6a of the glass panel member 6 makes an elastic contact with the hollow seal part 12 at a point deviating from the edge line 12c of the contact surface 12b of the hollow part 12a toward the inner-cabin side of the vehicle as illustrated by a solid line in FIG. 4 in comparison with a position illustrated by a two-dotted line in the same drawing, the primary seal lip 10 follows the glass panel member 6 toward the inner-cabin side of the vehicle and continues to make an elastic contact with the glass panel member 6. Accordingly, a push-press force F1 in a counterclockwise direction about the base end 12e is applied to the secondary seal lip 11, and thus a tip end of the lip body 11b of the secondary seal lip 11 is pushed in a direction F2 toward the inner side surface 6c of the glass panel member 6.

Thus, the tip end of the lip body 11b of the secondary seal lip 11 makes an elastic contact with the inner side surface 6c of the glass panel member 6, thereby pushing the glass panel member 6 back to the outer-cabin side of the vehicle to allow the outer-cabin side surface 6b of the glass panel member 6 to make a contact with the tip end of the primary seal lip 10.

As a result, a further improved sealing property is provided.

Moreover, even when the periphery end 6a of the glass panel member 6 makes a contact with the hollow seal part 12 at a point deviating from the edge line 12c of the contact surface 12b of the hollow part 12a toward the outer-cabin side of the vehicle as illustrated by a solid line in FIG. 5 in comparison with a position illustrated by a two-dotted line in the same drawing, the shared division wall 12d is pushed in an oblique downward direction F3 by the base end 12e of the circumference wall of the hollow part 12a. Therefore, the tip end of the lip body 11b of the secondary seal lip 11 is pushed toward an outer-cabin direction F4.

As a result, the tip end of the lip body 11b follows the glass panel member 6 deviating toward the outer-cabin side of the vehicle and makes an elastic contact with the inner side surface 6c thereof, whereby an improved sealing property is provided.

Figure 3D:
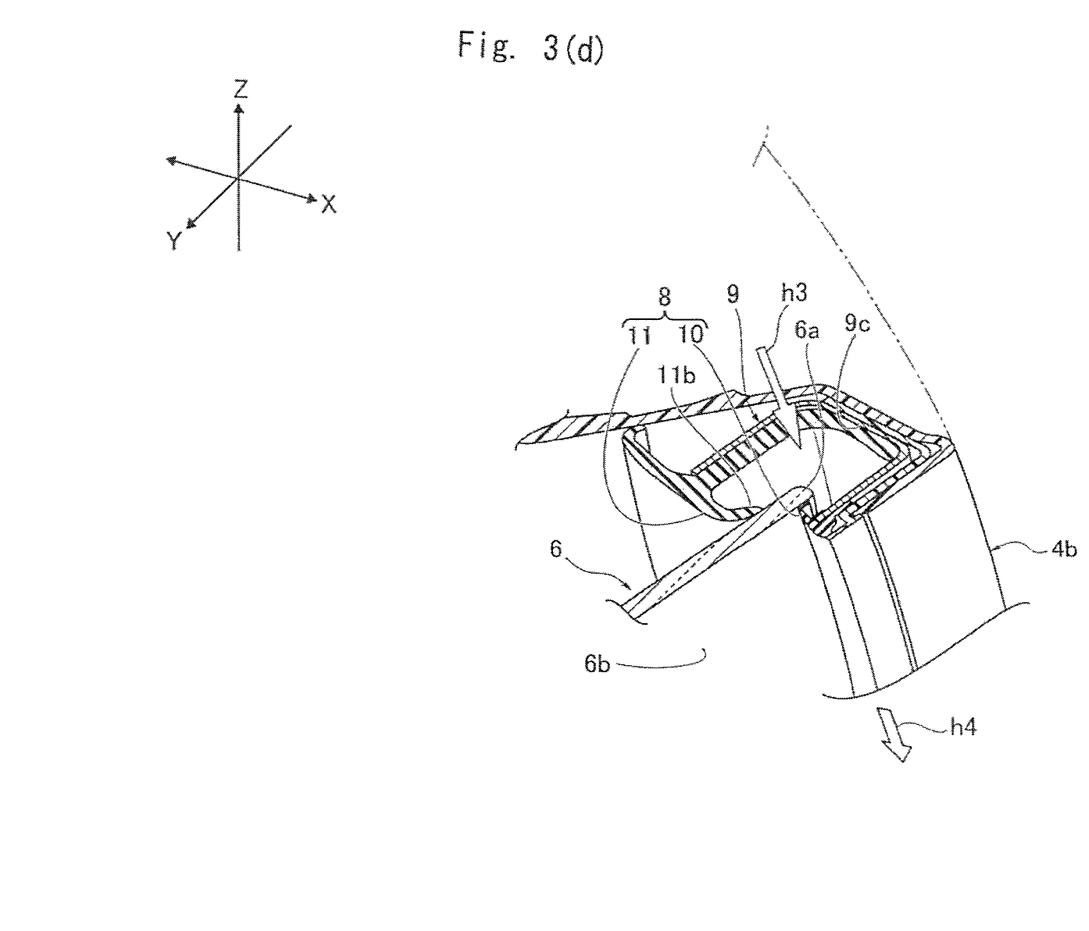
FIG. 3(d) is a cross section view along the line III-III in FIG. 2 showing a modified sealing structure for vehicle according to the invention in which components of the seal structure are illustrated.

FIGS. 3(a), 3(b) and 3(c) represent cross sectional views along the lines I-I, II-II and III-III in FIG. 2, respectively, while FIG. 3(d) also represents a cross section view along the line III-III in FIG. 2 as a modified example of the configuration in FIG. 3(c).

The configuration illustrated in FIG. 3(d) representing the cross section view along the line in FIG. 2 does not include a hollow part 12a at a bottom surface part of the retainer member 9, and a secondary seal lip 11 having a wall with an uniform thickness is formed along the inner-cabin side surface part of the retainer member 9 and the bottom surface part 9c thereof. The wall is formed form the base of the secondary seal lip 11. As described above, the weather strip member 8 configured as illustrated in FIGS. 3(a) and 3(b) (cross section views along the line I-I and II-II in FIG. 2, respectively) are able to provide a good sealing property. The weather strip member 8 illustrated in FIG. 3(d) (cross section view along the line III-III in FIG. 2) includes the secondary seal lip 11 along the bottom surface part 9c of the retainer member 9, which is thinner than the one having the hollow part 12 as illustrated in FIG. 3(c) in a thickness direction, so that the weather strip member 8 in FIG. 3(d) is able to give the periphery end 6a of the glass panel member 6 a more degree of freedom.

Accordingly, when the periphery end 6a of the glass panel member 6 requires a large space in the extending direction of the glass panel member 6 near the cross section view along the line III-III in FIG. 2 during an up-and-down movement of the glass panel member 6, the weather strip member 8 is able to decrease an interference friction with respect to the glass panel member 6, which is advantageous for both the weather strip member 8 and the glass panel member 6.

Further, it is possible to provide a wide space in an extending direction of the glass panel member 6 by elongating the outer-cabin side surface part and the inner-cabin side surface part of the retainer member 9 more than those in the configurations in FIGS. 3(a) and 3(b), which represent the cross sectional views along the lines I-I and II-II in FIG. 2, respectively, besides providing the wall having an uniform thickness along the bottom surface part 9c of the retainer member 9 while excluding the hollow seal part 12a.

The configuration in FIG. 3(d) representing the cross-sectional view along the line III-III in FIG. 2 excludes a seal member for the periphery end 6a of the glass panel member 6, and includes only the primary seal lip 10 and the secondary seal lip 11 for the inner-cabin and outer-cabin side surfaces of the glass panel member 6. However, this configuration is able to drain water on the seal lips to an outside of the vehicle since the weather strip member 8 is extending substantially in a vertical direction (Z direction) of the vehicle in the configuration, and thus the water is prevented from intruding in the inner-cabin side of the vehicle.

As mentioned hereinbefore, the cross section view along the line I-I represents at the substantially flat ceiling part 4c of the roof member 4, the view along the line II-II represents at the curved part 4a formed downwardly in a circular arc shape from the rear end of the ceiling part 4a, and the view along the line III-III represents at the rear pillar part 4b.

The seal structure for vehicle according to the embodiment of the present invention has been described referring to the drawings. However, the invention is not limited to this embodiment and includes any other modified configurations in design without departing from the scope of the invention.

Specifically, in the seal structure for vehicle according to the embodiment, the primary seal lip 10, the secondary seal lip 11 and the hollow seal part 12 of the weather strip member 8 vary their cross-sectional shapes at different positions in the extending longitudinal direction of the weather strip member 8. However, they can be integrally and smoothly formed together without forming step forms. Or, the seal structure for vehicle may be such that includes the weather strip member 8 with the hollow seal part 12, in which the primary seal lip 10, the secondary seal lip 11 and the hollow seal part 12 may change their cross-sectional shapes at any position with a plurality of step forms and may be connected at different position. The shape, number and material forming the parts of the weather strip member 8 are not limited.

The seal structure for vehicle according to the embodiment is applied to the body aperture of the vehicle 1. The seal structure, however, can be applied to a body aperture formed at a front, rear, corner, center or any other part of the vehicle. Moreover, the seal structure can be applied not only to the vehicle 1 having an internal combustion engine as a driving source but to an electric car and a hybrid car.

The invention claimed is:

1. A vehicular seal structure provided to a body aperture of a vehicle, the seal structure including a weather strip member, the weather strip member being coupled to a ceiling part, a curved part and a lower end of a rear pillar part of a roof member in a circumferential edge of the body aperture and adapted to make contact with to circumferential edge of a glass panel member designed to move upward and downward in the body aperture to provide a watertight sealing condition the weather strip member adapted to be tightly fitted to a retainer member, the retainer member having a substantially "U" shaped cross section and provided to the circumferential edge of the body aperture, the retainer member including an outer-cabin side surface part, an inner-cabin side surface part and a bottom surface part connecting between the outer-cabin side surface part and the inner-cabin side surface part, the weather strip member comprising a primary seal lip installed to the outer-cabin side surface part of the retainer member and adapted to make elastic contact with an outer side surface of the glass panel member;

a secondary seal lip installed to the inner-cabin side surface part of the retainer member and adapted to make elastic contact with an inner side surface of the glass panel member, and from the ceiling part to the curved part of the roof member in the circumferential edge of the body aperture, a hollow seal part installed at least to a part of the bottom surface part of the retainer member, the hollow seal part including a contact surface adapted to make elastic contact with the circumference edge of the glass panel member, the hollow seal part further including a hollow part inside the contact surface thereof, from the curved part to the lower end of the rear pillar part, the secondary seal lip having a wall with substantially uniform thickness being formed along the inner-cabin side surface part of the retainer member and the bottom surface part thereof, the wall being formed from the base of the secondary seal lip, in which the primary seal lip and the secondary seal lip are either integrally formed or separately formed, and are disposed separably at least at a part in a longitudinal, direction of the weather strip member; and when the circumferential edge of said glass panel member requires a space in an extending direction in which the circumferential edge of said glass panel member moves upward from the curved part to the lower end of the rear pillar part during an up-and-down movement of the glass panel member, the weather strip member decreases interference friction with respect to the glass panel member for said hollow seal part including the hollow part is not formed, wherein the hollow seal part including the hollow part therein is secured by a pair of engagement claw parts extending inwardly from inner side surfaces of both the outer-cabin side surface part and the inner-cabin side surface part of the retainer member, each of the pair of engagement claw parts is inserted into each of respective notches in the hollow seal part, the hollow seal part opposes the bottom surface part of the retainer member and includes the contact surface to which the circumferential edge of the glass panel member contacts.

2. The vehicular seal structure as defined by claim 1, wherein the outer-cabin side surface part and the inner-cabin side surface part of the retainer member are respectively elongated, and provide a wall having uniform thickness along the bottom surface part of the retainer member while excluding the hollow seal part.

3. The vehicular seal structure as defined by claim 1, wherein the contact surface raised by the hollow part comprises a head top part by which the contact surface is increasingly raised toward an inner-cabin side of the vehicle.

4. The vehicular seal structure as defined by claim 1, wherein the hollow seal part is integrally formed with the secondary seal lip, and a hollow part of the secondary seal lip is partly formed by a shared division wall that partly forms a wall forming the hollow part of the hollow seal part.

5. The vehicular seal structure as defined by claim wherein the hollow seal part is spaced apart from the bottom surface part by the pair of engagement claw parts.

6. The vehicular seal structure as defined by claim 1, wherein the pair of engagement claw parts are substantially parallel.

7. The vehicular seal structure as defined by claim 6, wherein the pair of engagement claw parts are offset.

8. The vehicular seal structure as defined by claim 1, wherein the pair of engagement claw parts are flat strips extending from the retainer member.

9. The vehicular seal structure as defined by claim 1, wherein the engagement claw part extending from the outer-cabin side surface part of the retainer is longer than the engagement, claw part extending from the inner-cabin side surface part of the retainer member.

10. The vehicular seal structure as defined by claim 1, wherein the retainer member is composed of a single component.

11. The vehicular seal structure as defined by claim 1, wherein the retainer member contacts the circumference edge of the body aperture.

* * * * *